United States Patent [19]
Britz

[11] Patent Number: 5,414,444
[45] Date of Patent: May 9, 1995

[54] PERSONAL COMMUNICATOR HAVING ORIENTABLE VIDEO IMAGING ELEMENT

[75] Inventor: David M. Britz, Rumson

[73] Assignee: AT&T Corp., Murray Hill, N.J.

[21] Appl. No.: 221,152

[22] Filed: Mar. 30, 1994

[51] Int. Cl.$^6$ ............................................... G09G 3/02
[52] U.S. Cl. .................................. 345/156; 348/151; 348/158
[58] Field of Search ............... 348/294, 333, 376, 373, 348/151, 158, 14; 379/37, 38; 345/156, 168, 169

[56] References Cited

U.S. PATENT DOCUMENTS

| | | | |
|---|---|---|---|
| 3,518,372 | 6/1970 | Johns | 348/373 X |
| 3,530,268 | 9/1970 | Aubrey | 348/373 X |
| 4,398,212 | 8/1983 | Serry et al. | 348/373 X |
| 4,524,384 | 6/1985 | Lefkowitz et al. | 348/373 X |
| 5,046,163 | 9/1991 | Priest et al. | 348/376 X |
| 5,077,784 | 12/1991 | Fujita et al. | 348/14 |

Primary Examiner—Ulysses Weldon
Attorney, Agent, or Firm—Alfred G. Steinmetz

[57] ABSTRACT

A personal communicator for use in a wireless communication network includes a wireless communications LCD and a multimedia LCD with the communications, mounded on a hinged member, and superimposed on top of the multimedia LCD. The communications LCD is sufficiently transparent to permit viewing of the under multimedia LCD. Each provides visual information to the user relative to the present use of the communicator. The selected use of the communicator is primarily responsive to the open or closed position of the hinged keyboard supporting cover. When the hinged member is closed the communicator operates in a communication mode. When it is open the communicator operates primarily in a multimedia mode. The personal communicator includes a steerable video imager for controllably optimizing image field coverage and adjusting to the orientation of the user relative to the personal communicator. The video imager includes an optical lens set and the imager is mounted on a mounting shaft so as to allow controlled rotation about its axis. The video imager includes mechanical apparatus interactive with the hinged keyboard supporting cover to reset its orientation to a standard position when the cover is closed and allow differing orientations when the cover is open.

7 Claims, 5 Drawing Sheets

PERSONAL COMMUNICATOR HAVING ORIENTABLE VIDEO IMAGING ELEMENT

FIELD OF THE INVENTION

This invention concerns personal communicators with video image recording capabilities for use in a wireless communication system. It is specifically concerned with orienting an image recording device to compensate for differing orientations of the personal communicator relative to the user.

BACKGROUND OF THE INVENTION

Personal communicators in wireless communications systems are being provided with video communication capabilities in addition to the voice and data functions. A video imager is provided within the personal communicator to accept a video image input. Because the personal communicator is small and highly mobile in the hands of the user, the video imager assumes many orientations relative to the user due to hand manipulation and related user orientation relative to the communicator. As a result the video imager may be inappropriately oriented to accept the desired image input.

SUMMARY OF THE INVENTION

According to the invention a video imager is provided in a personal communicator as recited in the appended claims.

In a particular embodiment a personal communicator includes a steerable video imager for controllably optimizing image field coverage and adjusting to the orientation of the user relative to the personal communicator. The video imager includes an optical lens set and the imager is mounted on a mounting shaft so as to allow controlled rotation about its axis. The video imager includes mechanical apparatus interactive with a hinged keyboard supporting cover included on the personal communicator housing to reset its orientation to a standard position to allow image receipt through the cover aperture, when the cover is closed and allow differing orientations when the cover is open.

In other embodiments the video imager may be mounted in a rotary gimbal mounting or in a ball and socket mounting. A flange is included around a circumference of the video imager to engage a mechanism associated with the hinged keyboard supporting cover for resetting the video imager to a standard position when the cover is closed.

DETAILED DESCRIPTION

Figure 1:
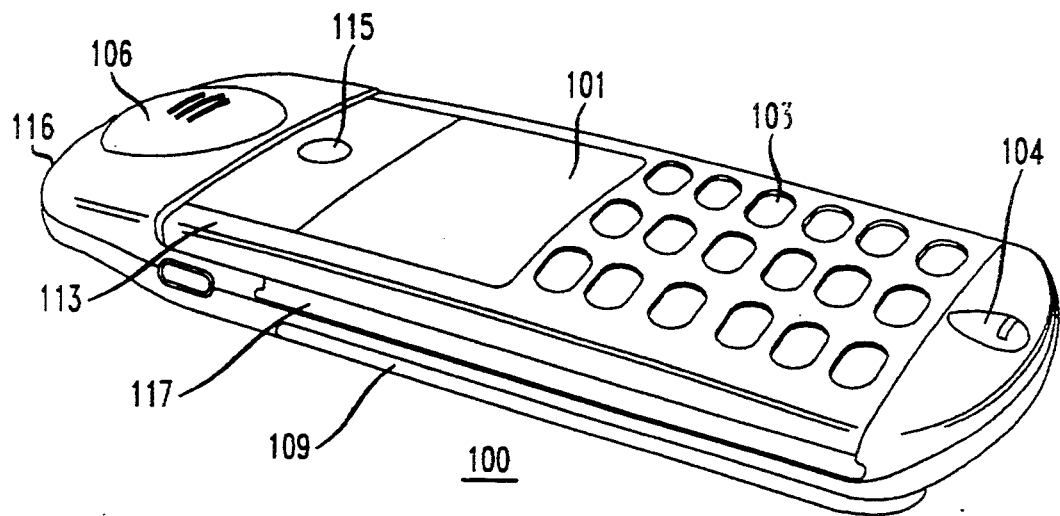
FIG. 1 is a pictorial schematic of a personal communicator.

The personal communicator shown in the FIG. 1 is designed to function in both conventional voice telecommunications and to function in a multimedia environment for the transmission of images and data and other various multimedia services. Multimedia services may be defined, herein, as wireless services such as visual display of data, interactive video, wireless note pad and similar type wireless services.

The housing of the communicator includes the necessary electrical, video and radio circuitry for it to function in a communication and multimedia mode. The personal communicator 100 includes a communication LCD output 101 and a plurality of cellular system push button key inputs 103, mounted on a hinged keyboard support 113, for inputting dial numbers and other control information vocal communication is by a speaker housing/output 106 for reception of voice communications and a microphone 104 for outputting a voice output of the user to a radiotelephone system. A battery pack 109 attached to the underside of the housing provides electrical power for the communicator. A miniature video image receptor 115 is provided for accepting the input of video images into the communicator for use in multimedia applications such as interactive video. It is accessible through an aperture 119 in the hinged keyboard support 113. This video image receptor is also accessible when the hinged keyboard support is open (FIG. 2) and is electronically and mechanically orientable to accommodate changes in the orientation of the communicator visa vis the user to receive transmit properly oriented input images.

The communicator includes a support housing 116 for supporting the various members of the communicator. Inserted into a receptacle of the support housing 116 is a sliding display frame 117 which supports a multimedia LCD which is mounted on the sliding display frame 117.

The communication LCD output 101 is provided for communicating information concerning the use of the communication as a radiotelephone and may be designated as a communication LCD for conveying information pertinent to the use of the personal communicator as a radiotelephone.

The communication LCD output unit 101 is sufficiently transparent so that the multimedia LCD on the sliding display frame may be viewed through the communication LCD output 101. This communication LCD output 101 is illuminated by LED devices (not shown) mounted on the sides of the communication LCD output 101.

The communicator includes the hinged member or keyboard support 113. The open or closed state of this hinged member determines the primary operative mode of the communicator. In the closed position of the hinged member, the communicator is switched in its communicator (i.e. cellular) mode. With the hinged member in its open position the communicator is operative in its multimedia mode. The change in modes is controlled by a switch or position responsive device in the hinge 128 which controls the mode selected in response to the hinged member state. This position responsive device may be a contact switch whose open/closed connect state is responsive to the angular relation of the hinged cover to the support member.

Figure 2:
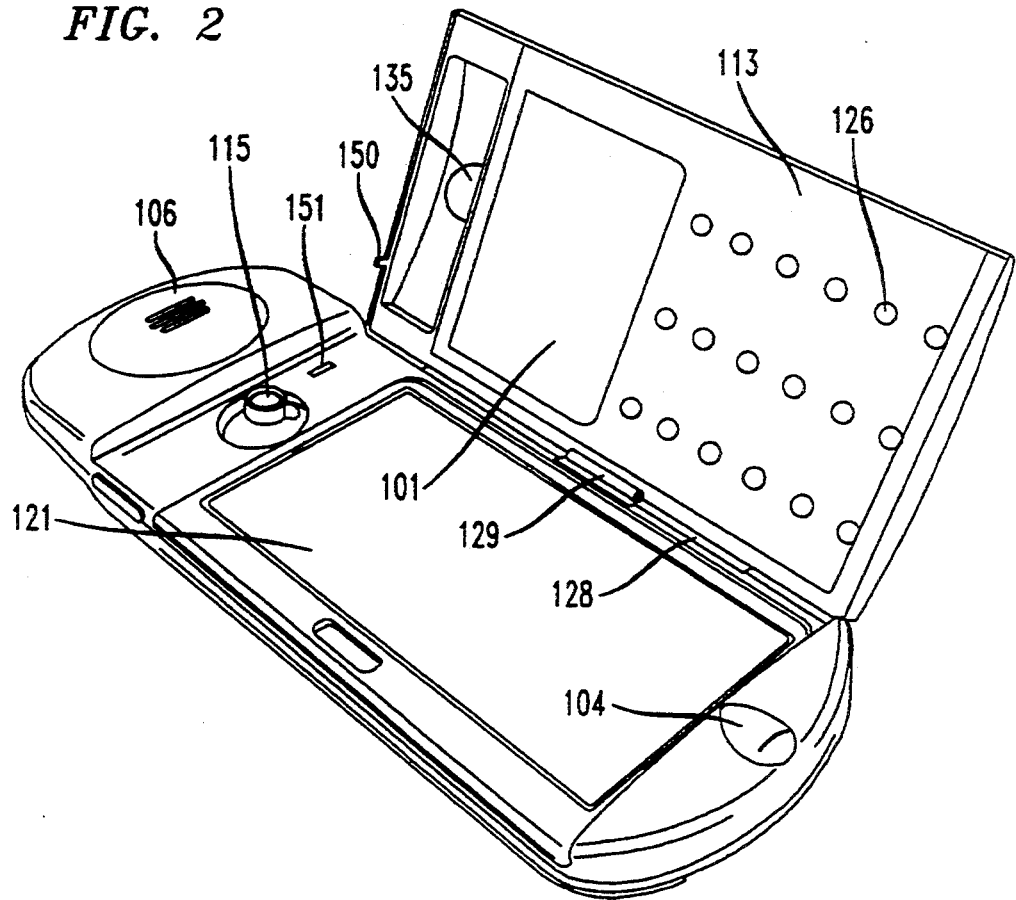
FIG. 2 is a pictorial schematic of the personal communicator with its top hinged panel in the open position.

The communicator is shown, in FIG. 2, with the hinged keyboard support 113 opened, by rotation about the keyboard cover hinge 128, to expose a high resolution color touch screen graphic display 121, which is supported by the sliding display frame 117. The underside of the hinged keyboard support includes a plurality of keyprobes 126 that respond to the push button input keys 103 to apply pressure to touch sensitive areas of the touch screen of the touch screen graphic display 121. A segment sliding cable 129 provides flexible hinged connection from the electrical circuitry of the communicator in the communicator housing to the hinged keyboard support 113. In this open position the video imager is electronically and physically adjustable permitting it to be directed to the appropriate image to be recorded. The hinged keyboard support includes a protuberance or knob 150 which engages the video imager mechanism through an aperture 151 to properly orient it when the support is in closed position.

Figure 3:
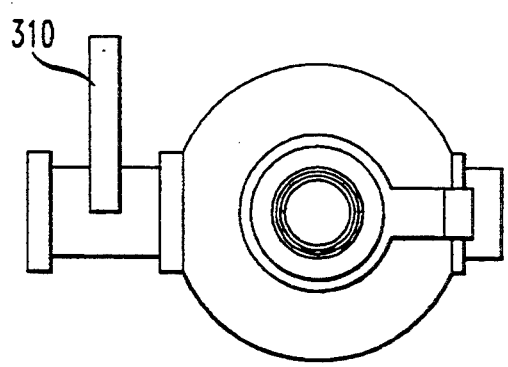
FIG. 3 is a plan view of the mechanism of an orientable video imager device.
Figure 4:
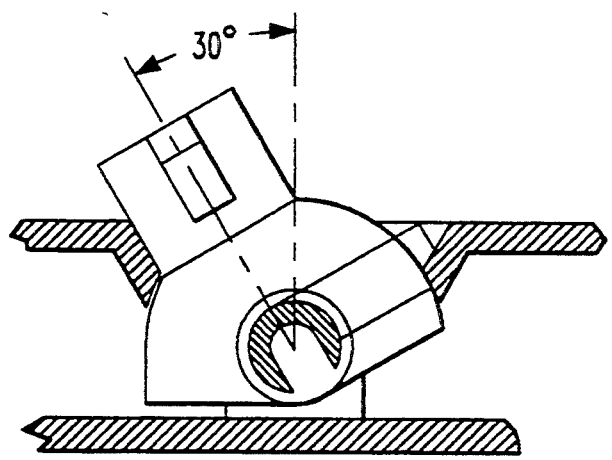
FIG. 4 is a elevation view of the orientable video imager device.
Figure 5:
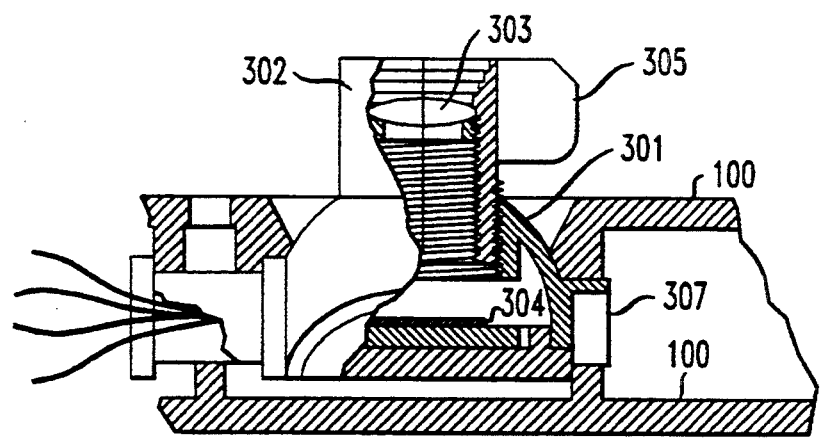
FIG. 5 is an another elevation view of the orientable video imager device.

The video imager is shown, as projected, in various orthographic planes in the FIGS. 3, 4 and 5. A video imager housing member 301 supports a lens housing 302 including a focusing lens 303. An internal imaging chip 304 is included in the housing in the focal plane of the focusing lens. An adjustment under the control of the focusing tab 305 is provided to focus the lens on the focal plane.

Housing member 301 is mounted on a shaft 307 mounted in the housing of the personal communicator 100. This permits rotation of the video imaging housing member about the shaft for directing the lens toward an image to be recorded. mounted on the video imaging housing member is a position return lever 310 which is engaged by a reset member 150 (see FIG. 2) protruding from the hinged keyboard supporting cover in its closed position to position the video imager housing so that it receives images through the aperture 119 in the cover when it is in the closed position. Cableing 141 joins the imaging chip 304 to video circuitry in the housing on the circuit board shown below in FIG. 6.

Figure 6:
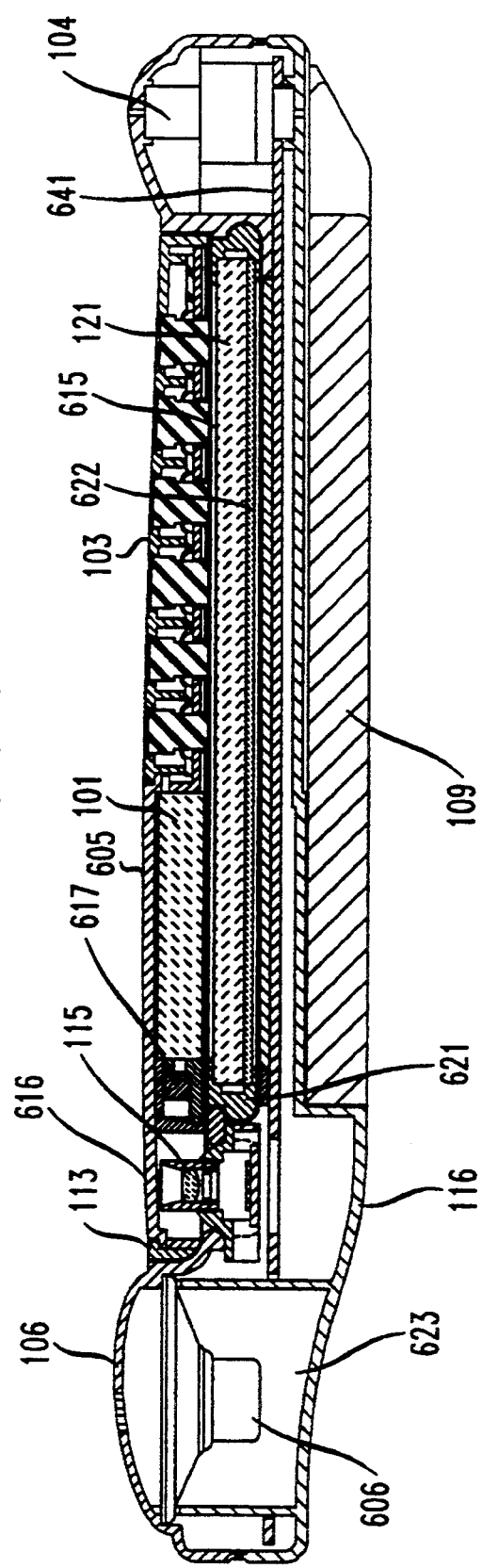
FIG. 6 is a longitudinal cross sectional view of the personal communicator.

The cross sectional view of FIG. 6 shows the structure of the personal communicator shown in the FIG. 1. The unit is housed by the support housing structure 116 which may be a molding of a plastic material. A speaker housing/output 106 at one end allows access to a speaker vibrator 606 which provides the speech acoustic output. A speaker acoustic cavity 633 resonantly enhances the received speech. A microphone 104 at the other end accepts acoustic/voice input.

The hinged keyboard support 113 provides support for a plurality of push buttons key inputs 103 which are part of the keyboard. The push buttons are designed to activate a touch sensitive layer 615 of the sliding multimedia display. A display window 605 allows the user to view the communication LCD display 101, included in the hinged cover, for cellular information readout. A LED light source 617 is positioned to the side of the cellular LCD and applies light to the side of the communication LCD 10 1 to illuminate it and increase contrast.

A slidable display comprising a high resolution multimedia display 121 is supported by a frame having a slide bearing 621 at each of its two ends. These slide bearings 621 engage a supporting slot in the support housing.

Illumination is provided by a electroluminescent panel which has its diffuse light applied to the underside of the high resolution color display 121 a light collector plate 622 which directs the light in a normal fashion onto the underside of the high resolution color display 121.

The circuitry of the personal communicator is mounted on a Printed Circuit Board 641 included within the communicator. Power is supplied by the battery pack 109 attached to the under side of the communicator.

A video input image receptor 115 is included in the video support module 616 adjacent to the communicator LCD. It is mounted on a supporting shaft as discussed with reference to FIGS. 3-5.

Figure 7:
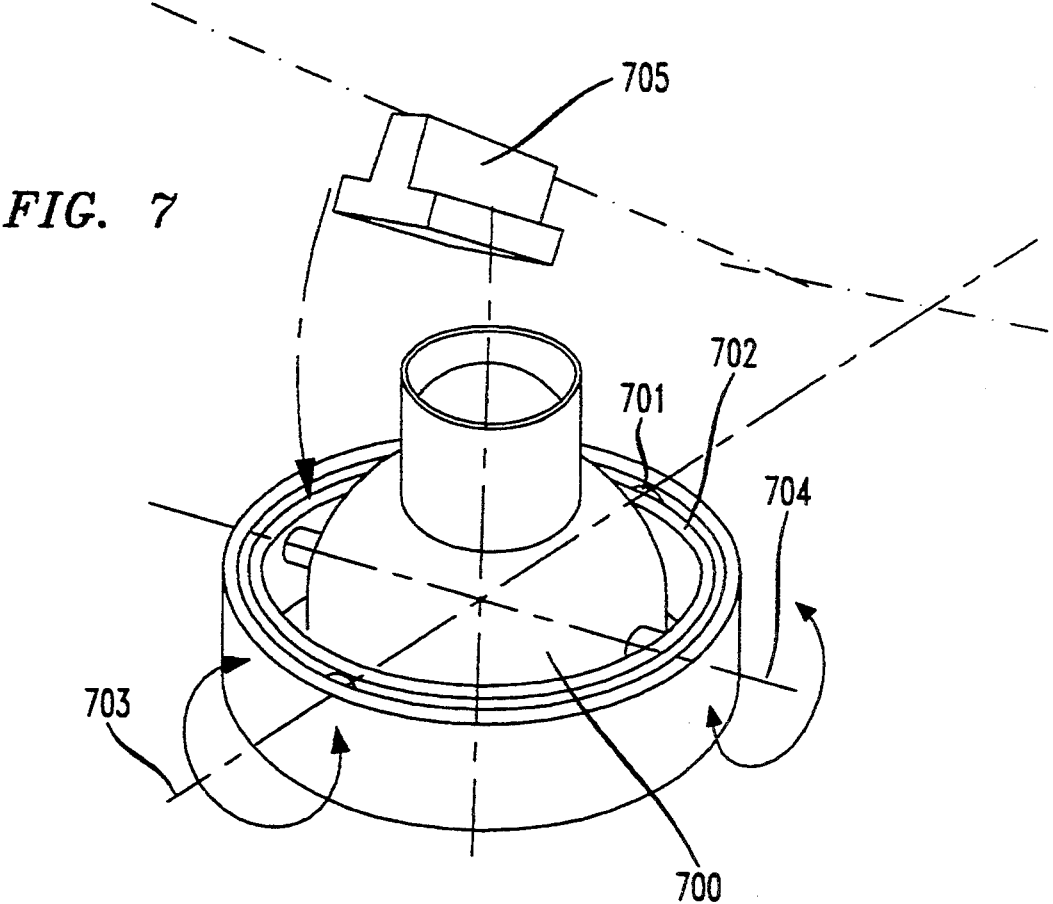
FIG. 7 is a pictorial schematic of another version of the orientable video imager.

An alternative construction of the video imager is shown in the FIG. 7 The video imager 700 is mounted on the communicator structure by a gimbal which includes two concentric ring supports 701 and 702 with each ring support mounted on an individual axial support, 703 and 704, with each each axle being at right angles to one another.

Figure 8:
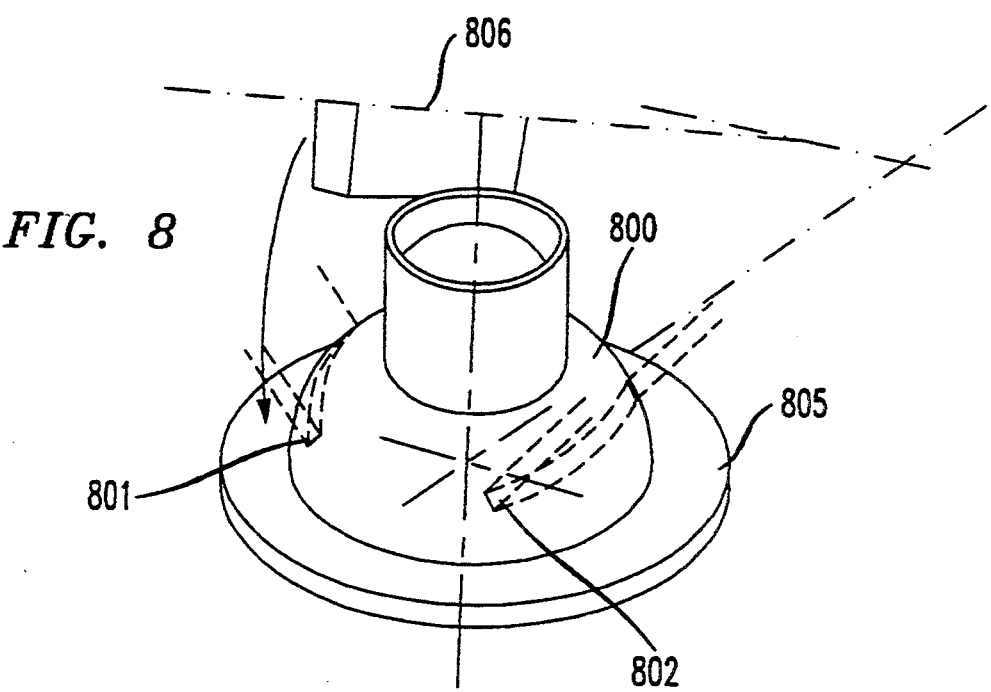
FIG. 8 is yet another pictorial schematic of another version of an orientable video imager.

The keyboard cover includes a position reset member 705 mounted on the cover and which engages the rings of the gimbal mounting to reposition the video imager orientation to its initial position when the cover is closed A ball and socket mounting arrangement of the video imager is shown in the FIG. 8. The ball structure of the video imager 800 is mounted within ball support socket surfaces 801 and 802, and below surfaces not shown, within the personal communicator. A reset hub 805 is positioned around the circumference of the ball structure of the video imager. This hub is engaged by a position reset member 806 when the cover is closed to reset the video imager to its reset position the cover is closed.

Figure 9:
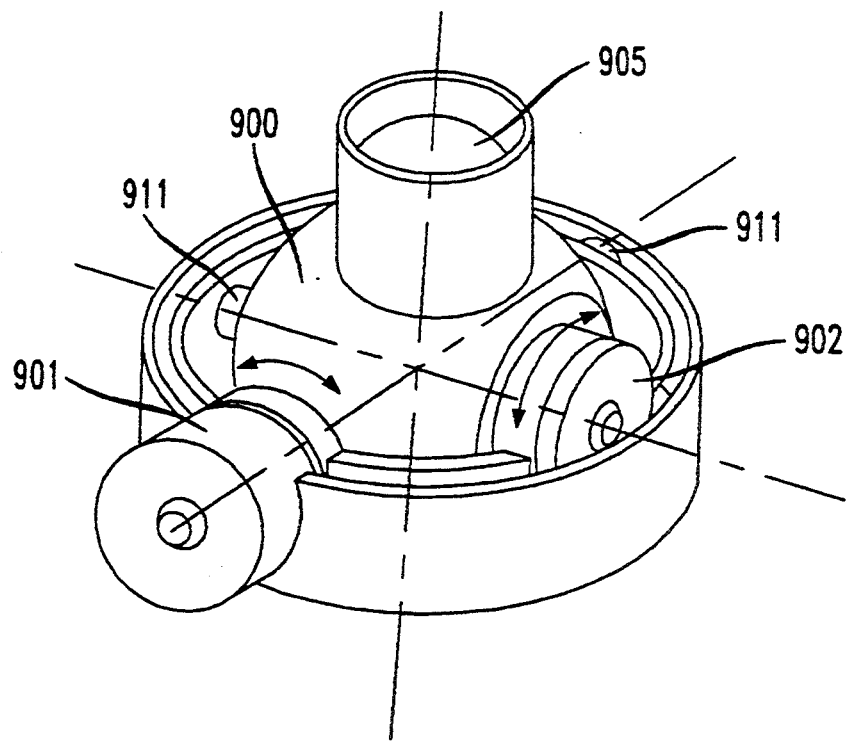
FIG. 9 is yet another pictorial schematic of another version of an orientable video imager.

The video imager 900, shown in FIG. 9, is a motorized universal joint video module with a two axis gimbal mount. The module is pivoted about two perpendicular axes 911 and 912. A first and second micro indexing motor 901 and 902, respectively, responds to closure of the handset cover to restore the module to a position where the lens 905 is positioned to receive images through an aperture in the cover. Activation of the micro indexing motors 901 and 902 is by switch means (not shown) responsive to closure of the cover member.

Figure 10:
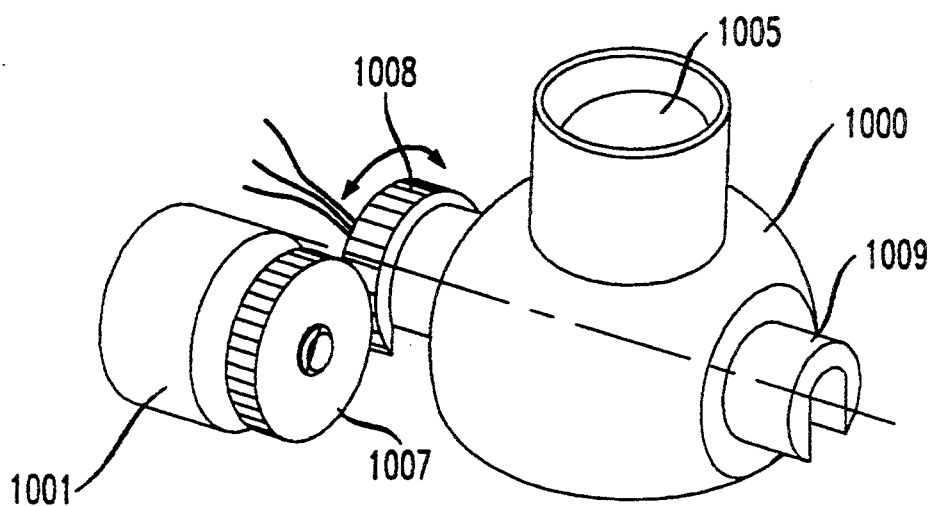
FIG. 10 is yet another pictorial schematic of another version of an orientable video imager.

The video imager 1000, shown in FIG. 10, is mounted on an axial bearing 1009 having a single axis 1011. The video module is rotated about the single axis in response to a micro indexing motor 1001 and through a gear connection including a driver gear 1007 and a follower gear 1008. The video module responds to the micro indexing motor to restore the lens 1005 to a position to receive images through an aperture in the cover. Activation of the micro indexing motor 1001 is by switch means (not shown) responsive to closure of the cover member.

I claim:

1. A personal communicator for radiotelephone communication with in a wireless communication system, comprising:

a support housing including a keyboard input mounted on a cover member connected by a hinge to the housing, a visual information display for information output positioned under the cover member and exposed when the cover member is open and a video image input module located adjacent the visual information display and accessible for visual input through a video camera aperture in the cover member when the cover member is closed;

the video image input module comprising:

a rotatable support mounted on a shaft defining a tilt axis and attached to the communicator housing;

a focusing lens mounted in a lens housing of the rotatable support;

an imaging collector mounted to receive images focused on it by the focusing lens;

a signal conductor for coupling the imaging collector to circuitry within the communicator housing;

a position reset lever connected to the rotatable support for adjusting an angular position of the rotatable support;

the cover member including means for engaging the position reset lever when the cover member is closed and positioning the video image module so that the focusing lens is aligned to receive images through the video camera aperture.

2. A personal communicator including;

a support member and a hinged keyboard supporting cover mounted by hinges to the support member;

a steerable video imager for controllably optimizing image field coverage and adjusting to the orientation of the user relative to the personal communicator;

the video imager being mounted on a mounting shaft, affixed in the support housing, so as to allow controlled rotation about its axis and allow differing image reception orientations when the cover is open and exposed for image reception through a cover aperture in the keyboard supporting cover;

the video imager including mechanical apparatus interactive with a protuberance of the hinged keyboard supporting cover to reset its orientation to a standard position to allow image receipt through the cover aperture, when the cover is closed.

3. A personal communicator including;

a support member and a hinged keyboard supporting cover mounted by hinges to the support member;

a steerable video imager for controllably optimizing image field coverage and adjusting to the orientation of the user relative to the personal communicator;

the video imager being mounted in a rotary gimbal mounting affixed in the support housing, so as to allow controlled rotation about two axes and allow differing image reception orientations when the cover is open and exposed for image reception through a cover aperture in the keyboard supporting cover;

the video imager including mechanical apparatus interactive with a protuberance of the hinged keyboard supporting cover to reset its orientation to a standard position to allow image receipt through the cover aperture, when the cover is closed.

4. A personal communicator as claimed in claim 3 including;

the mechanical apparatus including the gimbal mounting supporting the video imager.

5. A personal communicator including;

a support member and a hinged keyboard supporting cover mounted by hinges to the support member;

a steerable video imager for controllably optimizing image field coverage and adjusting to the orientation of the user relative to the personal communicator;

the video imager being mounted in a ball and socket mounting affixed in the support housing, so as to allow controlled rotation about multiple axes and allow differing image reception orientations when the cover is open and exposed for image reception through a cover aperture in the keyboard supporting cover;

the video imager including mechanical apparatus interactive with a protuberance of the hinged keyboard supporting cover to reset its orientation to a standard position to allow image receipt through the cover aperture, when the cover is closed.

6. A personal communicator as claimed in claim 5 including;

the mechanical apparatus including a flange included around a circumference of the video imager positioned to engage the protuberance of the cover to reposition the video imager to a standard position.

7. A personal communicator as claimed in claim 5 including;

the mechanical apparatus including a micro indexing motor for repositioning the the video imager to a standard position.

* * * * *